A. F. ZAHM.
SPEED METER FOR AEROPLANES.
APPLICATION FILED FEB. 20, 1918.
1,426,698.
Patented Aug. 22, 1922.
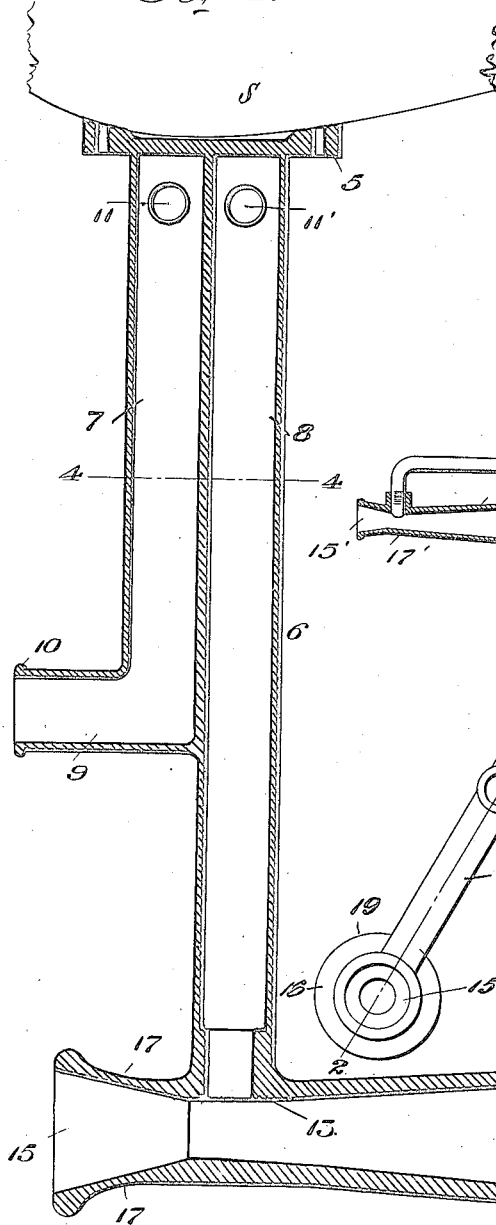
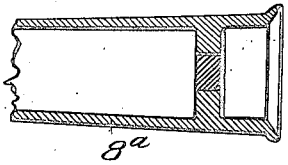
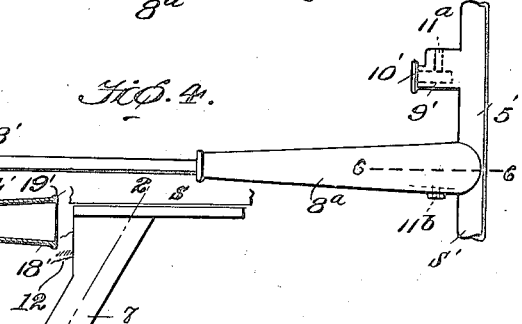
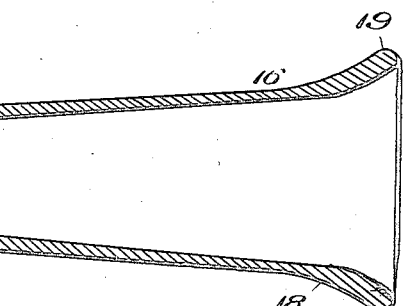
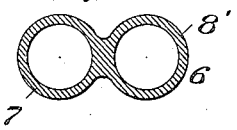
Inventor
Albert F. Zahm
By David Petter Moore
Attorney

UNITED STATES PATENT OFFICE.

ALBERT F. ZAHM, OF WASHINGTON, DISTRICT OF COLUMBIA.

SPEED METER FOR AEROPLANES.

1,426,698.      Specification of Letters Patent.     Patented Aug. 22, 1922.

Application filed February 20, 1918. Serial No. 218,233.

*To all whom it may concern:*

Be it known that I, ALBERT F. ZAHM, a citizen of the United States, residing at Washington, in the District of Columbia, have invented certain new and useful Improvements in Speed Meters for Aeroplanes, of which the following is a specification, reference being had therein to the accompanying drawing.

This invention relates to improvements in speed meters for aeroplanes, one object being the provision of a differential pressure speed meter that shall have a greater pressure difference so that a rugged gauge may be used, the same being capable of uniformity in manufacture and also uniformity and accuracy in reading.

A further object of this invention is the provision of a simple, rugged, durable and inexpensive device of this type, which is self-draining and water proof and whose reading will be unaffected by moisture due to splashing of sea or heavy showers of rain, the tubes being of such size as to prevent the bridging of a film of water across the ends thereof.

In speed meters now in use, there are no water traps to carry the water away from the essential parts or prevent the formation of a water film across the mouth of the suction conduit, which in practise impairs the efficiency of the device. The present device is so constructed as to insure the same reading regardless of the variations in direction of incidence which may occur in flight and is therefore unaffected by the entrance of water from spray or rain, during flight.

The present invention is the result of careful and painstaking experiments to produce an air directing and receiving member so that any form of pressure gauge of the drum aneroid type may be used and as such member is uniformly constructed and is preferably made from a single or integral piece of material, the construction thereof is standardized so that the instruments are readily interchanged and will each produce the same results upon the gauge.

In conjunction with the present air receiving or affected tubes, the drum for operating the indicator is controlled by the difference in air pressure, as will presently appear.

In the accompanying drawings:

Figure 1 is a front elevation of the complete device, minus the indicating gauge, the same being attached to the strut of the aeroplane, between the planes thereof.

Figure 2 is a section taken on line 2—2 of Figure 1.

Figure 3 is a section taken on line 4—4 of Figure 2.

Figure 4 is a view partly in section and partly in elevation of a modified form of my device.

Figure 5 is a section through the base of the member 8ª.

Figure 6 is a cross section through the attaching member.

Referring to the drawings, the numeral 5 designates the attaching plate which is formed integral with the member 6, which consists of two tubes, 7 and 8.

The tube 7 is provided with the right angled inlet terminal 9 having the head 10 and is shorter than the tube 8, there being a threaded opening 11 in communication with the inner end thereof for receiving a flexible metal tube (not shown) which conducts the air pressure entering the mouth 9 through the tube 7 to one side of the aneroid indicator, not shown.

It will be noted that the member 6, constituting the tubes 7 and 8, is disposed at an angle so when attached to the strut or rod "S," as shown in Figures 1 and 2, the passage ends will be inclined downwardly so that any water, due to spray or rain, entering the mouth 9 will be readily drained therefrom so as to not retard the air pressure and consequently, affect the reading of the indicator.

In one practical form the tubes 7 and 8 are each one-half inch in diameter everywhere, except that 7 contracts $\frac{1}{16}$ inch where it enters the throat at B, and the tube 7 is exactly four and one-half inches from the plate 5 to the extreme bend of the inlet 9, while the inlet 9 is ¾ inches long and is at exact right angle to the main portion 7.

The thickness of the material on the outside of the tubes 7 and 8 is $\frac{1}{16}$ inch, while the web therebetween is $\frac{3}{32}$ inch. The extreme length of the tube 8 is seven and one-quarter inches at the point of termination with the reduced portion 13 of the Venturi tube 14. This portion 13 of the Venturi tube is smallest in front of the inlet end of the tube 8 and diverges rearwardly thereof, increasing in diameter.

The Venturi tube 14 is formed intergral with the member 6 and is carried thereby, the same being shaped and constructed, after considerable experimenting, so as to produce the most efficient suction action within the tube 8, in proportion to the pressure action through the tube 7 upon the aneroid indicator.

The mouth 15 of the tube 14 is one and five-eighths inches in the extreme, while the inlet is one inch in diameter, extending inwardly for one inch, where it coincides with the one-half inch diameter of the reduced portion 13.

The long tapered end 16 of the tube 14 is approximately six and one-half inches long and increases in diameter from the reduced part of the portion 13, where it is one-half inch, to the extreme rear end, where it is one and seven-sixteenths inches.

It will be noted that the walls of the inlet end 15 are curved inwardly as at 17, this peculiar formation assisting in the efficiency of the present device, while the rear portion 16 at 18 is curved outwardly to provide the rim 19, such curve beginning approximately one inch from the extreme end of the member 16.

This in practise has been found to produce the maximum suction action in the Venturi tube and assists greatly in the operation of the present device, it having been found in practise that the present device will produce accurate readings regardless of the direction of movement of the aeroplane, the difference in air pressure, due to such variations of the flight, being so slight as to in no way affect the practicability of the present device.

From the foregoing, it is evident that the present device may be disposed between the planes, as shown in Figures 1 and 2, or attached to the supporting member for projection in front of the aeroplane, the gauge or indicator which may be similar to the indicator or speedometer shown in the U. S. patent to Bristol, No. 1,240,790, dated Sept. 18, 1917, said indicator being connected through the tubes which are connected by a threaded connection to the connections 11 and 11' of the respective tubes 7 and 8, gauge being disposed in position in ready sight while the member 6 with its Venturi tube 14, is disposed in the most advantageous position for action.

The question of size and proportion enters greatly into the present device as it has been found that by shortening the Venturi tube 14, the device is markedly less efficient, while if increased beyond the limits, the increased effect is practically nil.

By making the diameter of the tubes 7 and 8 one-half inch, it has been found in practice that no film of water will clog the inlet ends thereof and more particularly the inlet end of the tube 8 at its junction with the cylindrical portion 13 of the Venturi tube, while by inclining both of the tubes as illustrated, the device is absolutely self bailing or draining.

In the construction shown in Figures 5, 6 and 7, the attaching member or plate 5' is made angular as shown particularly in Figure 7, the same having cast integral therewith the tube $8^a$, which has attached thereto the reduced tube or pipe 8', which has threadedly or otherwise connected thereto the Venturi tube 14', the primed members therein shown indicating the parts corresponding to those shown in Figure 2.

Leading from the inner end of the tube $8^a$ is the internally threaded nipple $11^b$ which corresponds to the port 11' so that the proper connection can be made with the indicator.

Also formed integral with the attaching plate 5' is the short air induction mouth or member 9' which is provided with the bead 10', the internally threaded nipple $11^a$ being adapted to receive a connection to lead to the opposite side of the differential pressure gauge (not shown), but which is similar to the speedometer or pressure gauge shown in the U. S. patent to Bristol, No. 1,240,790, dated Sept. 18, 1917, or of a type operating in a similar manner.

The Venturi tube herein shown and described has been tested thoroughly so that the dimensions herein given have been found to give the best results possible, it having been discovered that if the rear end of the tube is amputated that the suction effect will be greatly diminished and if lengthened beyond the portion here shown, there will be very little increase in the suction.

What I claim as new is:

1. A gauge operating device including a base, a pressure tube and a suction tube formed integral therewith, the pressure tube being of shorter length than the suction tube and having an inlet at right angles to the body thereof, and an outlet adjacent the base, said suction tube being provided with an inlet adjacent the base thereof, and a Venturi tube attached to the outer end of the suction tube, the axial line of which is substantially parallel to the axial line of the inlet mouth of the pressure tube.

2. A gauge operating device for aeroplanes, including a single member having an attaching base, a short and a long tube parallel to each other and at an incline to the base, the shorter tube having an inlet at right angles to the body thereof, and a Venturi tube in communication with the end of the longer tube and having its inlet end projected in a plane parallel to the plane of the inlet end of the shorter tube, both of said tubes at the end adjacent the base being provided with an opening for connection of air conducting means.

3. A gauge operating device for aeroplanes, including a single member having an attaching base, a short and a long tube parallel to each other and at an incline to the base, the shorter tube having an inlet at right angles to the body thereof, and a Venturi tube in communication with the end of the longer tube and having its inlet end projected in a plane parallel to the plane of the inlet end of the shorter tube, both of said tubes at the end adjacent the base being provided with an opening for connection of air conducting means, said Venturi tube being so constructed as to have a reduced open portion of substantially the same diameter as its supporting tube.

4. A gauge operating device for aeroplanes, including a single member having an attaching base, a short and a long tube parallel to each other and at an incline to the base, the shorter tube having an inlet at right angles to the body thereof, and a Venturi tube in communication with the end of the longer tube and having its inlet end projected in a plane parallel to the plane of the inlet end of the shorter tube, both of said tubes at the end adjacent the base being provided with an opening for connection of air conducting means, said Venturi tube being provided at its outlet end with a gradually flared rim, the outside diameter of which gradually increases from a point adjacent its end to the end whereby the suction action within the Venturi tube is increased.

5. A gauge operating device for aeroplanes, including a single member having an attaching base, a short and a long tube parallel to each other and at an incline to the base, the shorter tube having an inlet at right angles to the body thereof, and a Venturi tube in communication with the end of the longer tube and having its inlet end projected in a plane parallel to the plane of the inlet end of the shorter tube, both of said tubes at the end adjacent the base being provided with an opening for connection of air conducting means, said Venturi tube being provided with a short flaring inlet mouth and a long flaring outlet mouth, said inlet mouth being in length substantially one-sixth of the outlet mouth.

In testimony whereof I affix my signature.

Dr. ALBERT F. ZAHM.

Witnesses:
 LARIMORE KEELEY,
 L. M. SIMPSON.